United States Patent [19]
Feng

[11] Patent Number: 5,990,783
[45] Date of Patent: Nov. 23, 1999

[54] OZONE/SUPERSONIC WAVE INSECT EXPELLING DEVICE

[75] Inventor: Hsiu-Mei Feng, Taipei, Taiwan

[73] Assignee: Long Well Electronics Corp., Taipei, Taiwan

[21] Appl. No.: 09/064,170

[22] Filed: Apr. 22, 1998

[51] Int. Cl.⁶ ..................................................... G08B 3/00
[52] U.S. Cl. .......................... 340/384.2; 62/92; 62/285; 204/164
[58] Field of Search .................. 340/384.2; 204/164, 204/165; 367/139; 43/124, 132.1; 62/92, 285

[56] References Cited

U.S. PATENT DOCUMENTS

| | | | |
|---|---|---|---|
| 4,015,366 | 4/1977 | Hall, III | 47/1.01 R |
| 4,137,062 | 1/1979 | Mullerheim et al. | 71/9 |
| 4,191,647 | 3/1980 | Mullerheim et al. | 210/128 |
| 5,630,915 | 5/1997 | Greeene et al. | 204/164 |
| 5,845,504 | 12/1998 | LeBleu | 62/92 |

*Primary Examiner*—Edward Lefkowitz
*Assistant Examiner*—Davetta Woods
*Attorney, Agent, or Firm*—Dougherty & Troxell

[57] ABSTRACT

An ozone/supersonic wave insect expelling device has an ozone generating circuit and a supersonic wave generating circuit which use the same power source so to generate supersonic wave for expelling pest insect, and for generating ozone for clearing the air. Therefore, ozone/supersonic wave insect expelling device has a dual effect.

5 Claims, 4 Drawing Sheets

OZONE/SUPERSONIC WAVE INSECT EXPELLING DEVICE

BACKGROUND OF THE INVENTION

1. Field of the Invention

The present invention relates to an ozone/supersonic wave insect expelling device which is not only used to generate a supersonic wave for expelling pest insects, but also for generating ozone for clearing the air so to retain a clean environment.

2. Description of the Prior Art

Referring to FIG. 1, a prior air cleaning machine is shown. A negative ion cleaning machine comprises a shell A the front end of which is pivotally connected with a cover B. The cover may move upwards and downwards for opening and closing. A movable clamping piece C may be arranged on the front end of the shell A for clamping a carbon fiber D. The movable clamping piece C is connected to a high voltage static electric generator E. The high voltage static electric generator E is connected with a neon lamp F and a network G which is arranged on a fixing piece and may be taken down easily.

Since the electric field is strong near the electrode, the electrons and ions generated from the natural radiation will be accelerated to a high speed to collide with air molecules, thus the molecules will be ionized. The ionized positive ions and free electrons will speedily collide with other air molecules, thus another positive electrons and free electrons are further generated. This process is repeated continuously (which is called the avalanche multiplier effect). When the ionized positive ion has returned to the electrode, since they will collide with the electrode or air molecules, many free electrons are generated, these electrons will move to the electrode plate (network) being grounded along the direction of electric field, thus the floating particles in the air may be collected. However, this machine only has the effect of cleaning air.

Therefore, an ozone/supersonic wave insect expelling device has been disclosed in the present invention, wherein by a convertible control switch not only ozone is generated for cleaning air, and retaining fresh air, but also a supersonic wave will be generated for expelling mosquitoes, flies and other pest insects. Thus, the means has dual effect.

SUMMARY OF THE INVENTION

Accordingly, the object of the present invention is to provide an ozone/supersonic wave insect expelling device which not only is used to generate a supersonic wave for expelling pest insect, but also for generating ozone for clearing air.

Therefore, the ozone/supersonic wave insect expelling device of the present invention comprises an ozone generating circuit and a supersonic wave generating circuit, wherein the ozone generating circuit includes an amplifying circuit, a voltage multiplying circuit, and a needle shape discharge end, while the supersonic wave generating circuit is connected to a buzzer through a power source supply circuit, a rectangular wave generating circuit and a voltage increasing circuit, by a mullet-stage switch said ozone generating circuit and said supersonic wave generating circuit are connected as an integral body and use the same power source so to generate a supersonic wave for expelling pest insect, and for generating ozone for clearing the air. Thus, the ozone/supersonic wave insect expelling device of the present invention has dual effects.

The present invention will be better understood and its numerous objects and advantages will become apparent to those skilled in the art by referencing to the following drawings in which:

BRIEF DESCRIPTION OF THE DRAWINGS

FIG. 2-1 is a partial circuit diagram of the present invention.

FIG. 2-2 is another partial circuit diagram of the present invention.

DETAILED DESCRIPTION OF THE PREFERRED EMBODIMENT

Figure 1:
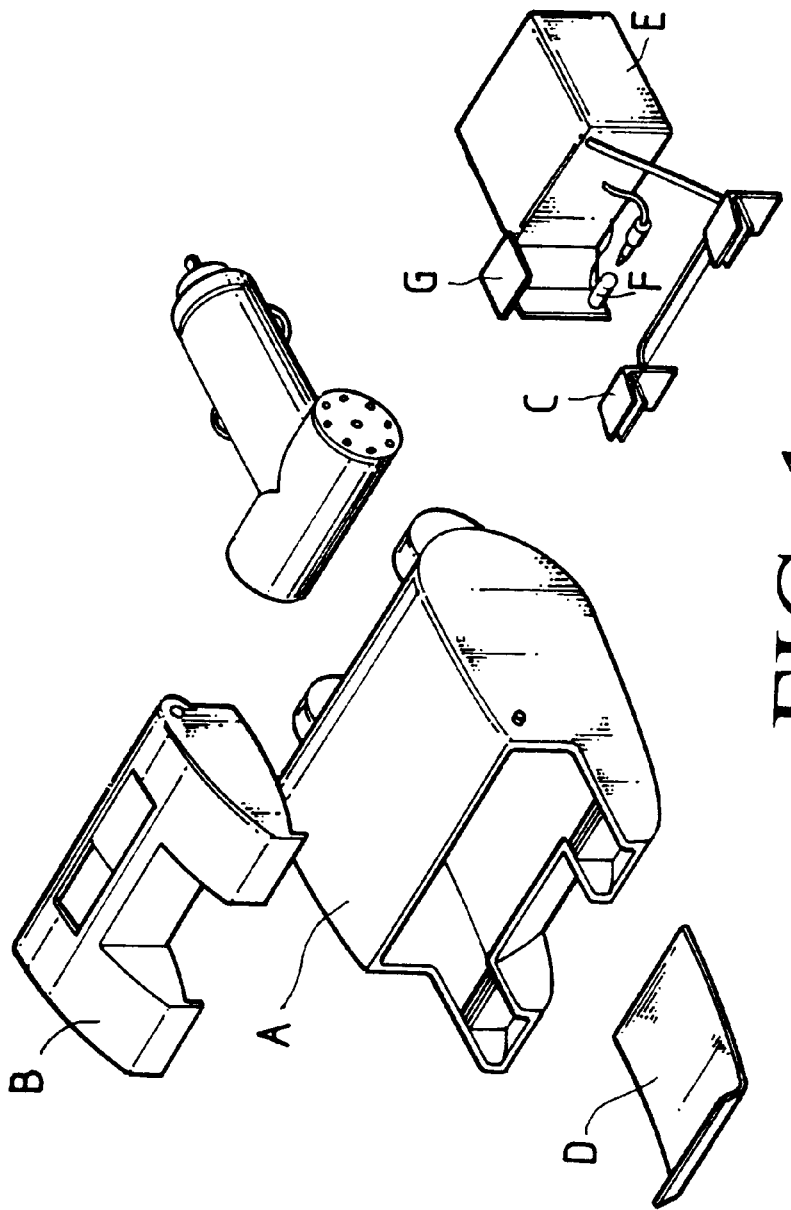
FIG. 1 is an exploded view of a prior air cleaning machine.
Figures 1, 2:
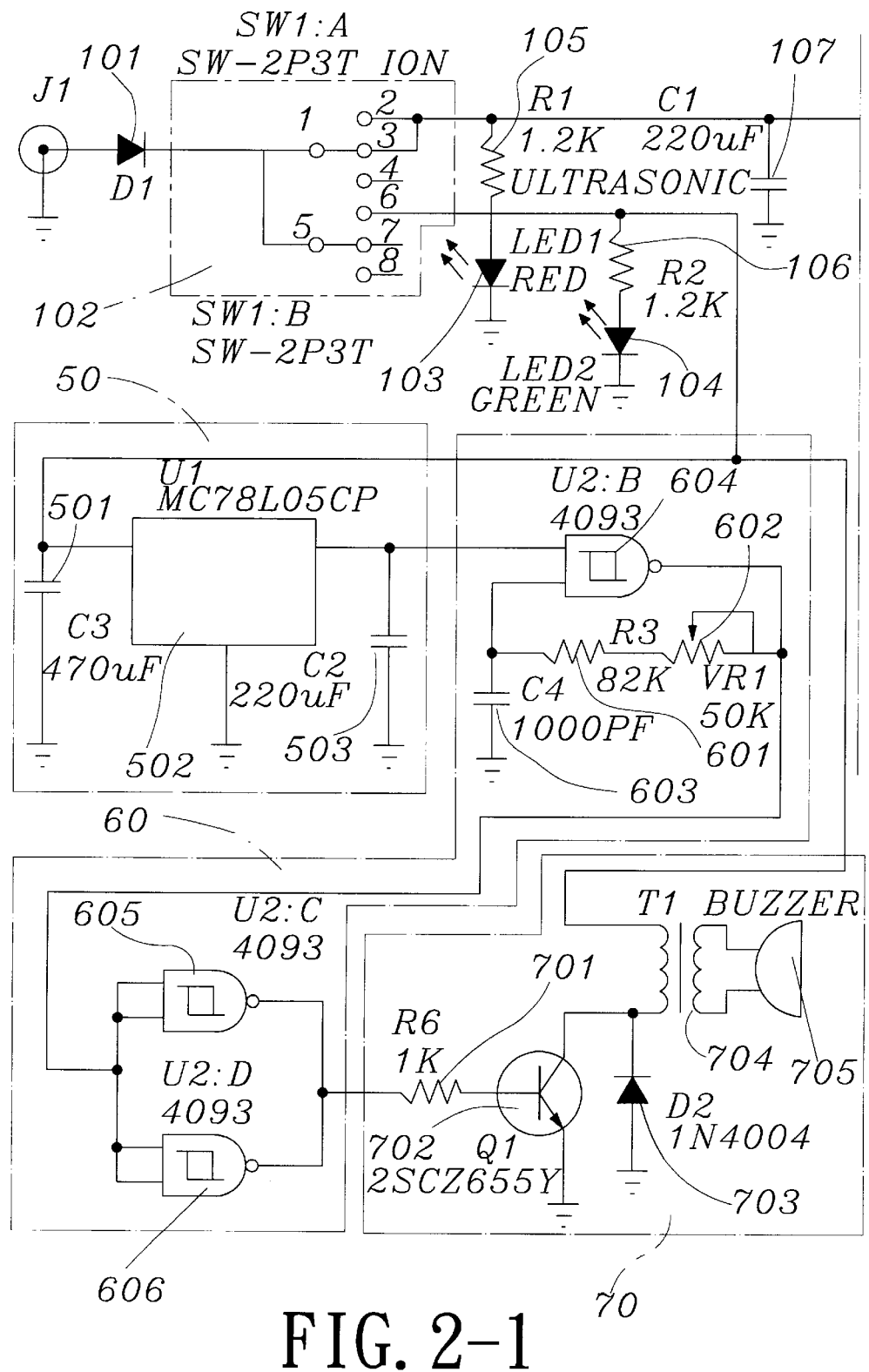
Figure 2:
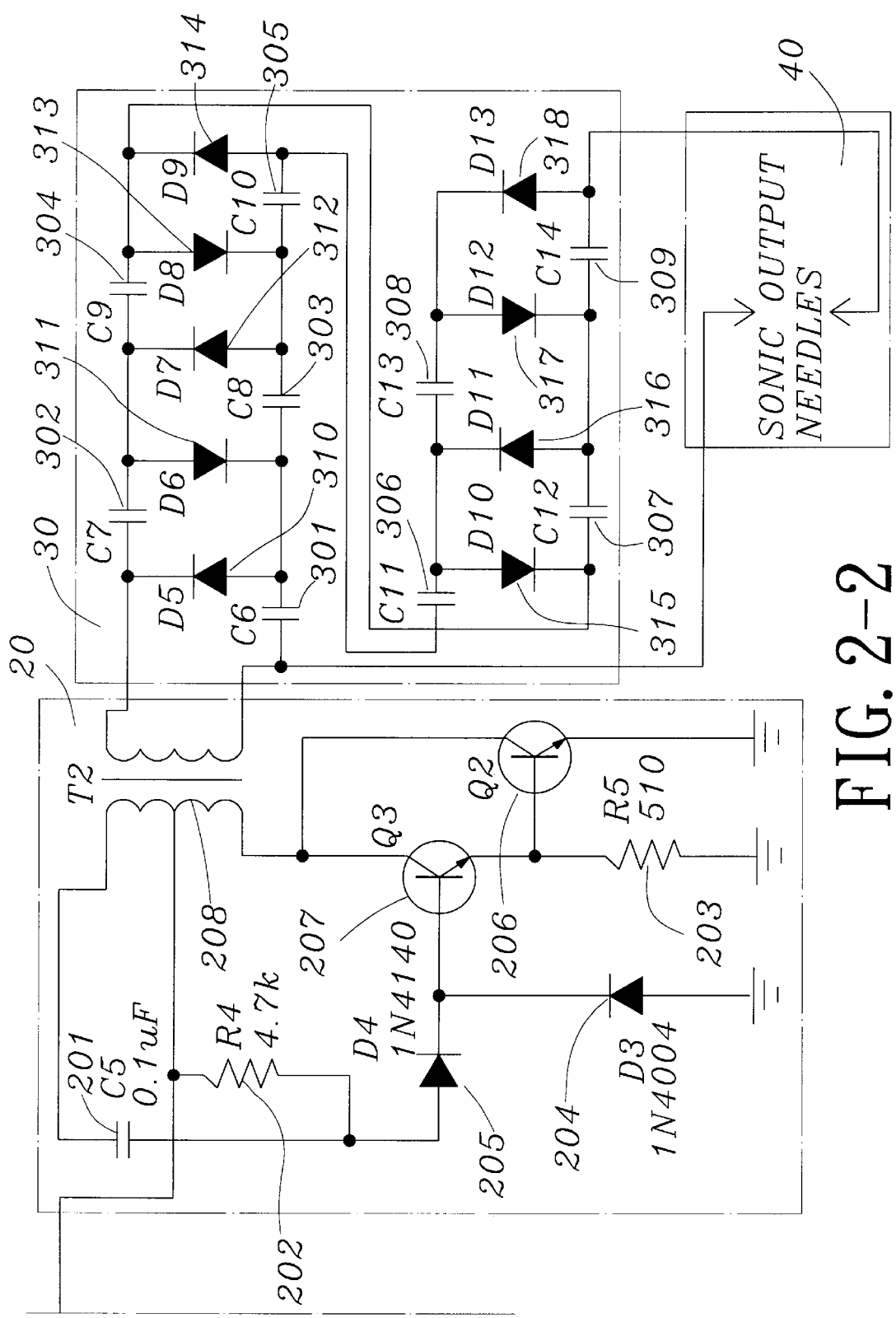
Figure 3:
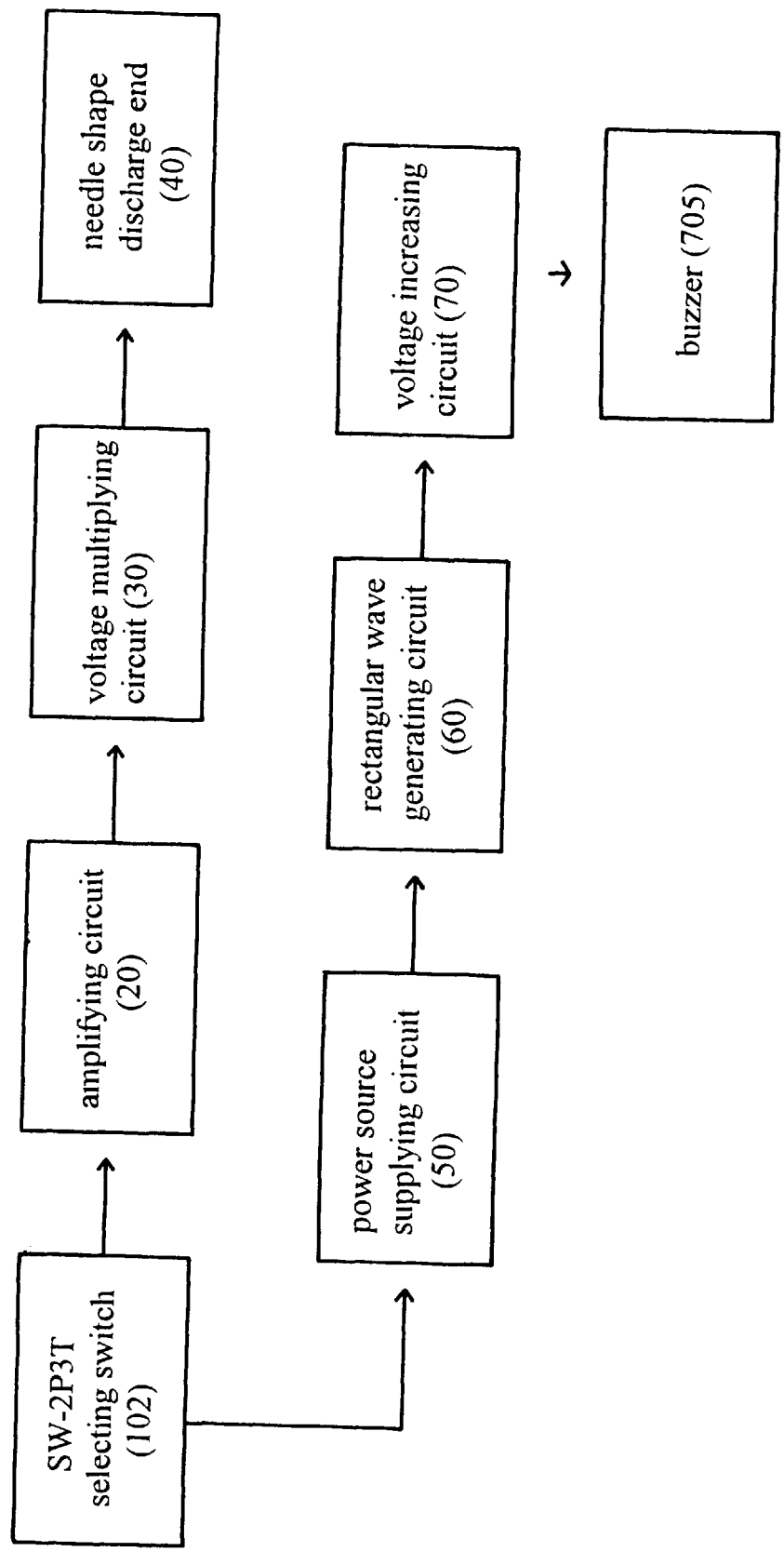
FIG. 3 is a simplified flow diagram of the present invention.

As shown in FIG. 2-1 and 2-2, the ozone/supersonic wave insect expelling device of the present invention comprises a SW-2P3T selecting switch 102, an amplifying circuit 20, a voltage multiplying circuit 30, a power source supply circuit 50, a rectangular wave generating circuit 60, a voltage increasing circuit 70 and a buzzer 705. Referring to FIG. 2-1, after the power source is conducted, the voltage will pass through a polarity protecting device D1 diode 101, then three selections are possible:

1. The switch 1 on one side of the SW-2P3T selecting switch 102 is switched to ozone generating circuit contact 2 or 3, while the switch 5 on another side is switched to ozone generating circuit contact 7 or 8. Thereby, the red LED 103 will light up, then the signal is amplified through the amplifying circuit 20 formed by C5 capacitor 201, R4, R5 resistors 202, 203, D3, D4 diodes 204, 205, and Q2, Q3 transistors 206, 207. The amplified signal is transformed through T2 transformer 208 and then is outputted. The signal will be transmitted through the voltage multiplying circuit 30 formed by C6, C7, C8, C9, C10, C11, C12, C13, C14 capacitors 301, 302, 303, 304, 305, 306, 307, 308, 309 and D5, D6, D7, D8, D9, D10, D11, D12, D13 diodes 310, 311, 312, 313, 314, 315, 316, 317, 318 so that the oxygen $O_2$ will be discharged by the high voltage of the voltage multiplying circuit 30, then it is obtained a negative ion through a needle shape discharging end 40 so to form as ozones $O_3$, therefore, it has the effect of cleaning air and the air will become fresh.

2. The switch 5 on one side of the SW-2P3T s electing switch 102 is switch ed to supersonic wave generating circuit contact 6, while the switch 1 on another side is switched to position 4. Thereby, the green LED 104 will light up, and a steady voltage 5 V is provided by a power supply circuit 50 formed by C2, C3 capacitors 503, 501 and U1 voltage regulator 1C502, the voltage is supplied to rectangular wave generating circuit 60 to oscillate to generate a rectangular wave, wherein the rectangular wave generating circuit 60 is formed by a Schmitt trigger IC 604, 605, 606, C4 capacitors 603, R3 resistor 601, and VR1 variable resistors 602. Then the rectangular wave is outputted through a voltage increasing circuit 70 to drive a voltage driving buzzer 705, thus the effect of expelling insect pest is achieved.

3. The switch 1 on one side of the SW-2P3T selecting switch 102 is switched to the ozone generating circuit contact 2 or 3, while The switch 5 on another side is switched to supersonic wave generating circuit contact 6. Thereby, the red LED 103 and green LED 104 will light up, the two circuits repeat said operation sequence, and ozone having the function of killing germs is generated for clearing air and retaining the fresh air. Meanwhile, the high frequency sonic wave expels mosquitoes, flies, cockroach, and other pest insects.

In summary, the ozone/supersonic wave insect expelling device of the present invention is formed by a simple circuit. The fresh air may be retained as the insect is expelled. For current insect expulsion, it is a novel invention in space arrangement. Although certain preferred embodiment of the present invention has been shown and described in detail, it should be understood that various changes and modification may be made therein without departing from the scope of the appended claims.

What is claimed is:

1. Apparatus for expelling insects and for purifying air comprising:
    a) an ozone generating circuit having a first input, an amplifying circuit portion connected to the input to amplify a signal received through the first input, the amplifying circuit including a transformer, a voltage multiplying circuit portion connected to the transformer, and a needle shaped discharge element connected to the voltage multiplying circuit to produce a discharge thereby forming ozone when a signal is applied to the first input;
    b) a supersonic wave generating circuit including a second input, a rectangular wave generating circuit portion connected to the second input to generate a rectangular wave when a signal is received through the second input, a voltage increasing circuit portion receiving the rectangular wave and driving a buzzer to generate a high frequency sonic wave in the air to expel insects;
    c) a common power supply connected to the ozone generating circuit and the supersonic wave generating circuit; and,
    d) a multi-position switch device connected to the ozone generating circuit and the supersonic wave generating circuit, the switch device movable between a plurality of positions whereby neither circuit is activated, only the ozone generating circuit is activated, only the supersonic wave generating circuit is activated, and both circuits are activated.

2. The apparatus of claim 1 further comprising visual indicia connected to the ozone generating circuit providing a visual indication that the ozone generating circuit is activated.

3. The apparatus of claim 2 wherein the visual indicia comprises a light emissive diode (LED).

4. The apparatus of claim 1 further comprising visual indicia connected to the supersonic wave generating circuit providing a visual indication that the supersonic wave generating circuit is activated.

5. The apparatus of claim 4 wherein the visual indicia comprises a light emissive diode (LED).

* * * * *